July 26, 1949.　　　　R. L. HALLOCK　　　　2,477,178
FASTENING DEVICE

Filed May 6, 1943　　　　　　　　　　　　　2 Sheets-Sheet 1

INVENTOR
Robert Lay Hallock
BY
Jarvis C. Markle
his ATTORNEY

July 26, 1949.  R. L. HALLOCK  2,477,178
FASTENING DEVICE
Filed May 6, 1943  2 Sheets-Sheet 2
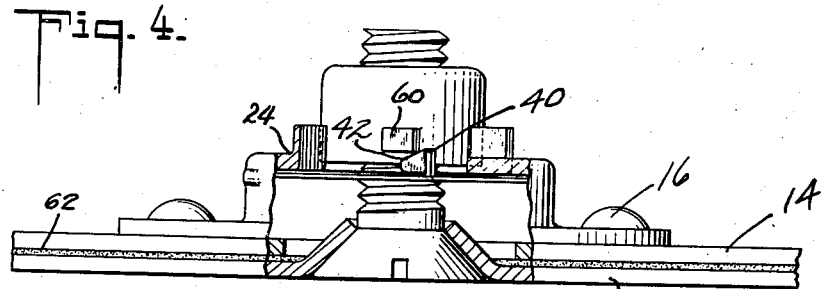
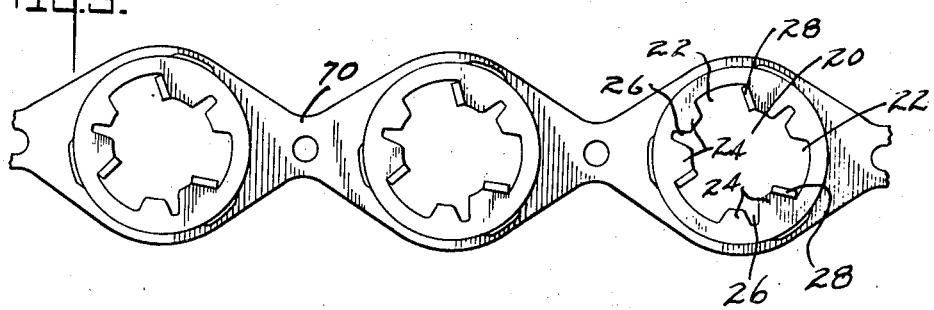
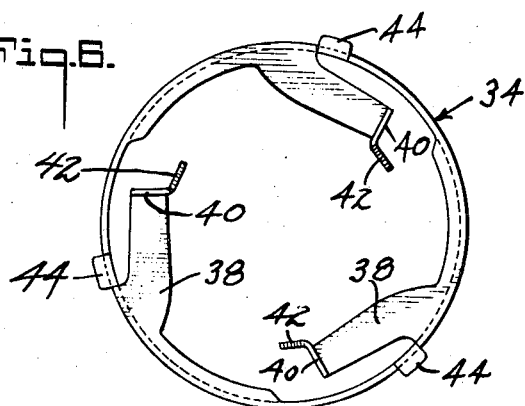
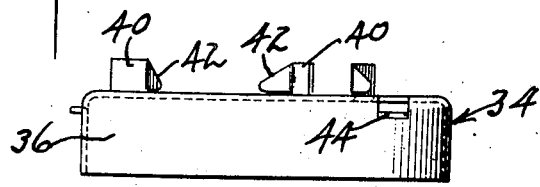
INVENTOR.
Robert Lay Hallock
BY
his ATTORNEY

Patented July 26, 1949

2,477,178

UNITED STATES PATENT OFFICE 2,477,178

FASTENING DEVICE

Robert Lay Hallock, Larchmont, N. Y., assignor to Elastic Stop Nut Corporation of America, Union, N. J., a corporation of New Jersey Application May 6, 1943, Serial No. 485,931

4 Claims. (Cl. 24—221)

The present invention relates to fastening devices and has particular reference to fastening devices for detachably securing together two bodies one of which it is desired to be quickly removable from and reattached to the other. Still more particularly the invention relates to such devices for detachably securing together two bodies consisting of thin metal plates or the like.

Devices of the kind to which this invention relates are used extensively in aircraft and other structures where it is necessary to provide cover plates for access openings, removable cowlings and the like. These structures are ordinarily of light sheet metal of such thin section as to make it impractical to provide direct threaded connections and numerous fastening devices adapted to be attached to such structures have heretofore been proposed, which among other things, enable the parts to be attached and detached more rapidly than is possible by screwing together or unscrewing a threaded connection of the usual kind as provided by a screw or bolt and nut. The majority of such fastening devices of the quickly detachable variety depend, however, upon some form of latching means of the bayonet type in which the clamping pressure is exerted by a spring or other yieldable member. In such devices the clamping is not positive and it is possible for the clamped parts to pull apart to some extent when subjected to stress sufficient to flex the spring or other resilient members. Other such devices, while providing positive clamping pressure, are deficient in other respects, and the general object of the present invention is the provision of a new and improved fastening device which will provide among other things positive clamping pressure, compactness and rigidity, lightness in weight, cheapness and simplicity of manufacture, and the ability to clamp and reclamp parts together which may through being warped or because of extraneous material such as dirt adhering to the surfaces be slightly separated from each other rather than in close direct contact at the time when it is desired to clamp them together.

Other and more detailed objects of the invention together with the advantages to be derived from its use will appear in connection with the description contained in the ensuing portion of this specification to which reference may best be had for a better understanding of the more detailed nature of the invention and the manner in which it may be carried into effect. In the drawings forming a part hereof, Fig. 1 is an elevation of a fastening device embodying the invention;

Fig. 4 is a side elevation partly in section showing the device with the parts together and ready to be turned to clamping position;

Fig. 5 is a plan view showing a multiple unit form of bearing member;

Fig. 6 is a plan view of a spring element used in the device; and

Fig. 7 is a side elevation of the element shown in Fig. 6.

Figure 1:
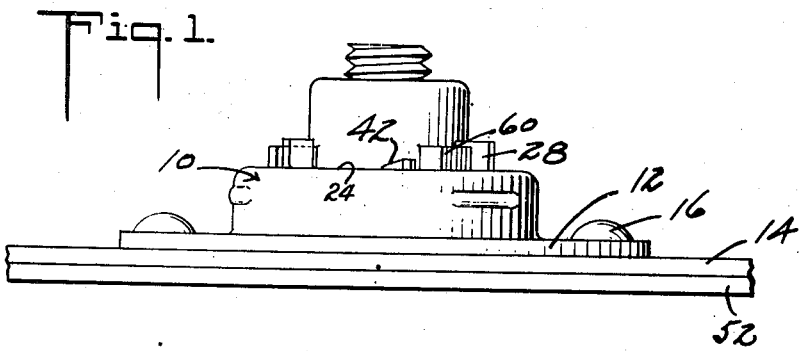

Referring now to the drawings, 10 designates a bearing member which ordinarily but not necessarily is of sheet metal such as steel, aluminum or the like, shaped to desired configuration by known drawing and stamping operations. Member 10 comprises an annular flanged base portion 12 which in the embodiment illustrated is adapted to be fixed to another body such as plate 14 by means of rivets 16 passing through suitable apertures in the base portion of the bearing member, or by other known means.

Member 10 is shaped to provide a circular body portion 18 open at one end and at its other end having an aperture 20 (see Fig. 5), the perimeter of which is recessed at spaced intervals by recesses 22 to provide a series of perimetrally interrupted marginal bearing surfaces 24 separated by the recesses 22. Each of the bearing surfaces 24 is notched intermediate its ends by a radially extending notch 26 and an upwardly projecting stop 28 is provided at one end of each of the bearing surfaces.

The body portion 18 is also internally recessed to provide a series of perimetrally spaced recesses 32 in the side wall, the purpose of which will be described later.

Referring now more particularly to Figs. 6 and 7 an annular spring element 34 is shaped to provide a cylindrical body portion 36 and a plurality of perimetrally spaced spring arms 38 extending inwardly from the top of the cylindrical body portion, these arms lying generally along chords of the circle defined by the cylindrical body portion. At their free ends the arms 38, which are stamped from the material of the member, are bent upwardly to provide projecting stops 40 and inclined cam surfaces 42.

The outer edge of the body portion 36 is provided with a plurality of perimetrally spaced tabs 44 formed out of the material of the member and bent outwardly from the body portion.

Figure 2:
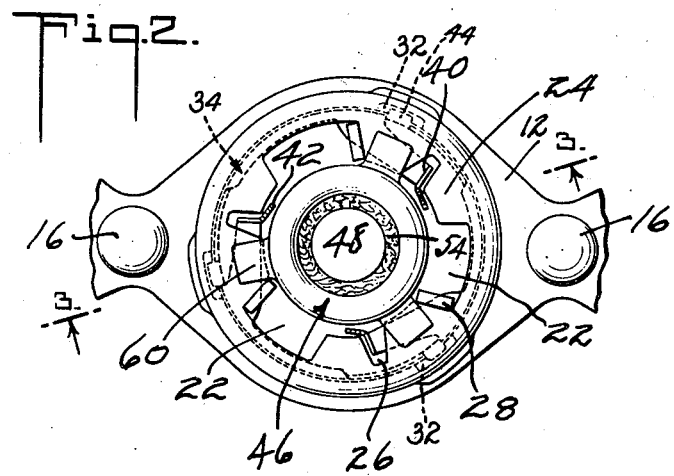
Fig. 2 is a top plan view of the device shown in Fig. 1.
Figure 3:
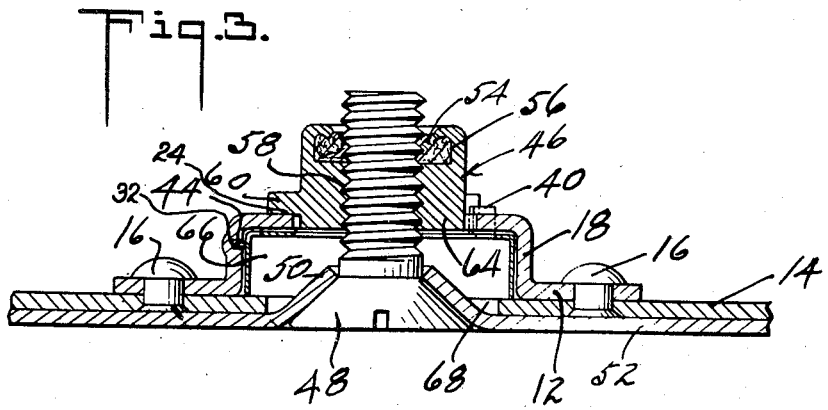
Fig. 3 is a section taken on the line 3—3 of Fig. 2.

Referring now more particularly to Figs. 2 and 3, the member 34 is assembled within the body portion of the bearing member 10 with the spring arms 38 underlying portions of the bearing surfaces 24 and with the stops 40 projecting upwardly through the slots 26 as will be seen more clearly from Fig. 2. With the parts in this relation the cam surfaces 42 lie at the perimeter of the aperture 20 radially inside of the inner radius of the bearing surfaces 24. The cam surfaces 42 are located so that when the parts are in properly assembled relation in which they are held by the tabs 44 being snapped into the recesses 32, the low ends of said cam surfaces are flush with or slightly below the level of the bearing surfaces 24 while the upper ends of said cam surfaces are on a level with and in effect merge with the upper edges of the stops 40.

The unit described is adapted to cooperate with a clamping member which in the present embodiment comprises a clamping nut indicated generally at 46 engaging a threaded element 48 which in the present embodiment is in the form of a flat headed machine screw, the head of which engages an indented opening 50 in a second body such as plate 52 which is to be clamped to the plate 14. The nut 46 grips the screw 48 with sufficient frictional contact to require appreciable torque to turn the nut on the screw. The frictional engagement between these parts can be obtained in different ways, but a most satisfactory method of obtaining this is to make the nut in the form of a self locking nut embodying the principles of the invention disclosed in Patent No. 1,550,282 granted to T. G. Rennerfelt. A nut embodying these principles has been shown and comprises an annular locking insert 54 of washer like form secured in a suitable recess 56 at one end of the threaded bore 58 of the nut. The insert is made of vulcanized fibre or other relatively soft elastic material and is initially unthreaded, a thread being impressed therein by the screw when the nut is first applied. Due to the action of the locking insert the nut is constantly maintained in frictional gripping relation on the screw so as to turn therewith unless an appreciable amount of torque is applied tending to turn the nut upon the screw.

The body portion of the nut is preferably but not necessarily circular as shown in the drawings and is provided with a plurality of perimetrally spaced projections 60. The diameter of the body portion of the nut and the size and location of the projections 60 are such as to permit the nut to pass through the aperture 20 in certain positions of rotation, as when the projections register with the recesses 22 in the bearing member, while in other positions of rotation the projections are adapted to engage the bearing surfaces 24.

The action of the device will be largely evident from the drawings, the clamping member being assembled on the part 52 and the nut being inserted through the aperture 20 when the parts 14 and 52 are brought together to be secured. Assuming that the nut is threaded on the screw 48 to a position where the projections 60 will clear the bearing surfaces 24, the screw is then turned and the nut, because of its frictional grip on the screw, will also turn so that the projections 60 will slide across the bearing surfaces 24 until the projections abut against the stops 28. Thereafter, continued turning of the screw will advance the nut on the screw so as to clamp the parts together.

It will be noted that in moving from the inserted position in which the projections 60 are in registry with recesses 22 to the clamping position in which these projections are against the stops 28, the projections must pass the spring stops 40. This is accomplished by the fact that the projections 60 first engage the inclined cam surfaces 42 and ride over these surfaces. This action operates to depress the spring stops 40 so that the projections 60 can pass over them. When the nut is turned to the clamping position shown in Fig. 2 the spring stops 40 again are in positions projecting above the bearing surfaces 24.

Assuming now that the parts are in the clamped position shown in Figs. 1-3, if it is desired to release them the screw 48 is backed off. As soon as the clamping pressure is relieved sufficiently to release the frictional locking grip between the projections 60 and the bearing surfaces 24, the nut turns with the screw until the projections abut against the spring stops 40. These stops prevent further turning movement of the nut until the screw is turned sufficiently to back the nut off to a height such that the projections will clear the tops of the spring stops 40. After the nut has been backed off to this extent it can then be turned with the screw to the position in which the projections register with the recesses 22 and when in this position the clamping element and its associated plate 52 can be removed.

The reason for providing the spring stops, which require that the nut be backed off an appreciable distance more than the amount required merely to relieve the clamping pressure, is in order to insure reapplication of the clamping member when the parts are again reassembled, even if due to slight warping of the parts or the presence of dirt or other foreign matter between the parts to be clamped together, the surfaces of these parts cannot be brought into close contact.

In Fig. 4 a condition is illustrated in which the parts 14 and 52 are slightly separated by dirt or other extraneous material 62 which has accumulated on the surfaces of one or both parts. If it is now assumed that these parts have previously been clamped together in close contact as in Fig. 3, and the clamping member had been released without the spring stops 40 having been present, it will be apparent that the nut would be in a position on the screw such that the projections 60 would not pass entirely through the aperture 20 in the bearing member, but would be in a position such that upon turning the screw they would strike the edges at the ends of the recesses 22 and not pass over onto the bearing surfaces. If, under such conditions, the operator continued to turn the screw, the nut would be held against rotation by the edges of the recesses and would advance on the screw, thus aggravating the condition. Consequently if it were not for the spring stops and the function accomplished by them, it would be necessary to adjust the position of the nut on the screw by hand after the device had once been applied and released, in order to reapply it if there should be any appreciable separation between the parts 14 and 52 at the time when reapplication was attempted.

By reference to Fig. 4 it will be seen that with the present arrangement reapplication is insured even if the parts 14 and 52 are separated to an appreciable extent. As previously explained, a previous removal of the clamping member has required the backing off of the nut, due to the action of the spring stops 40, to an extent such that the projections 60 have material clearance above the bearing surfaces. Now if on reapplication the parts 14 and 52 were in close contact the projections 60 would clear the spring stops 40, the clearance between the projections and the bearing surfaces being the same as when the parts were detached from each other. With the parts 14 and 52 separated as shown in Fig. 4, the projections do not clear the bearing surfaces with as much clearance as when the parts were detached, but they still are sufficiently high to clear the edges of the recesses 22 and move over the bearing surfaces. Since under the assumed conditions the projections are not as high as when the parts were detached, they will strike the cam surfaces 42 as indicated in Fig. 4 to depress the spring stops 40 in the same manner as previously described, in order to move across the bearing surfaces to positions in contact with the fixed stops 28.

Thus, by the use of the spring stops, it is possible to insure ready reapplication of the parts even though the main bodies to be detachably secured together are not in perfect condition so as to insure close surface contact between them.

Preferably, but not necessarily, the projections 60 are located intermediate the ends of the body portion of the nut, the base portion 64 of the nut which extends below the level of the projections 60 providing a circular guide located in the aperture 20 at the time when the nut is being turned and advanced on the screw to clamp the parts together.

In the present embodiment the number of projections on the nut and the corresponding number of recesses, bearing surfaces, stops, etc. on the bearing member to cooperate therewith is three. This number evidently can be altered but a minimum of three is desirable in order to insure maximum stability of the clamping member against tilting or cocking in case there is any tendency of the parts 14 and 52 to move laterally relative to each other due to any lateral or shear stresses to which they may be subjected.

It will further be evident that the body portion 18 of the bearing member may be made of less height than in the embodiment illustrated but this height has certain advantages. By making this member in the manner shown a clearance space 66 is provided in which the nut can be rotated after the parts 14 and 52 are brought into contacting relation and before the projections 60 on the nut have passed into or through the recesses 22 in the bearing member. This is an advantage since devices of the kind under discussion are ordinarily used in multiple unit installations with a comparatively large number of the devices operating to clamp two bodies together. When the parts are put together it will rarely happen that all of the nuts of the clamping members are in positions of rotation so that the projections will register with and pass through the recesses 22 in the bearing members. Consequently, if clearance spaces are not provided in the bearing surfaces to accommodate these projections until the nuts can be turned to the proper positions of rotation to pass through the recesses, it might not be possible to get the bodies which are to be clamped together into contacting relation until after all of the clamping members have been turned to the proper position. This would obviously be an inconvenience. Also the clearance space 66 provides space for the reception of an indented aperture or equivalent arrangement permitting the clamping element to lie flush with the outer surface of the body 52, which in many instances, is highly desirable. Also the indented aperture on the body 52 may, if desired, be formed in relation to the size of the opening 68 in the body 14 so that lateral movement between these two parts may be positively limited to a relatively small amount by direct lateral contact between the parts if there is any substantial relative lateral movement.

In the majority of instances, fastening devices of the kind described will be applied individually at substantially spaced intervals. In some cases, however, where the bodies to be clamped together are relatively flexible and it is desired to maintain a relatively tight connection amounting substantially to a seal between them, the fastening units may be relatively closely spaced. In such instances, it may be desirable to employ what may be termed a multiple fastening unit in which a series of bearing member units are formed from a single strip of material as illustrated in Fig. 5. In this instance the configuration of the bearing members is as previously described, but the individual members are joined together, preferably by relatively narrow neck portions 70 capable of being bent so that the line of bearing members may follow a curved rather than a plane surfaced body to which the fastening unit is attached, or may be placed so that the apertures 20 of the individual bearing members may register with a curved or other layout of openings in the body to which the unit is attached.

While for purposes of illustration a suitable form of fastening device for carrying the invention into effect has been shown, it will be readily apparent that many changes in the form and arrangement of the parts may be made without departing from the principles of the invention. It is accordingly to be understood that the invention embraces all forms of device falling within the scope of the appended claims.

What is claimed:

1. A fastening device of the character described comprising, in combination, a fastening unit adapted to be secured to a first body over an opening therein, and a clamping member adapted to engage a second body to be removably clamped to said first body, said fastening unit including a part having an aperture shaped to provide a plurality of perimetrally interrupted marginal bearing surfaces and a part providing yieldable stops associated with said bearing surfaces, and said clamping member including a threaded element for holding said second body and a nut tightly engaging said threaded element, said nut having perimetrally spaced projections located to pass through said opening and said aperture in a first position of rotation of the nut and to engage said bearing surfaces in a second position of rotation of the nut to clamp said bodies together when advanced on said threaded element, said stops being located and arranged to yieldably retract thus permitting said nut to turn from said first position to said second position and engaging said nut and requiring the same to be backed off said fastening element a predetermined distance from clamping contact with said bearing surfaces before moving from said second position to said first position.

2. A fastening device comprising a fastening unit including a bearing member adapted to be secured to a first body over an opening therein, said bearing member having an aperture shaped to provide a plurality of perimetrally interrupted marginal bearing surfaces, and a rotary clamping member adapted to be attached to a second body to be clamped to said first body, said rotary member including a threaded element and a nut, said nut having perimetrally spaced projections located to pass through said opening and said aperture in a first position of rotation of the nut and to engage said bearing surfaces in a second position of rotation of the nut, stop means for holding said nut against rotation in said second position whereby to cause the nut to be advanced on the threaded element when the latter is turned, whereby to clamp said bodies together and yieldable stop means retractable for permitting movement of said nut from said first position to said second position but preventing turning movement of said nut from said second position to said first position until the nut is backed off from clamping engagement with said bearing surfaces a predetermined distance.

3. In a fastening device, a bearing member having an annular base portion adapted to be secured to a body and a body portion projecting from said base portion, said body portion having an aperture shaped to provide a plurality of perimetrally interrupted marginal bearing surfaces, fixed stops at one end of each of said surfaces and yieldable stops projecting upwardly from each of said surfaces, said yieldable stops having cam means associated therewith for engagement with an element moving in one direction across said surfaces to depress said stops and said yieldable stops operating to prevent movement in the opposite direction of an element across said bearing surfaces until the element is moved a predetermined distance axially way from said surfaces.

4. In a fastening device, a bearing member having an annular base portion adapted to be secured around an opening in a body and an annular body portion projecting from said base portion, said body portion having at one end thereof an aperture shaped to provide a plurality of perimetrally interrupted marginal bearing surfaces, fixed stops projecting upwardly from one end of each of said surfaces, and a spring member located within said body portion, said spring member having fingers providing yieldable stops normally projecting above the plane of said bearing surfaces and cam surfaces located to be engaged by an element passing across said bearing surfaces in one direction to depress said stops and permit said element to move into contact with said fixed stops.

ROBERT LAY HALLOCK.

REFERENCES CITED

The following references are of record in the file of this patent:

UNITED STATES PATENTS

| Number | Name | Date |
| --- | --- | --- |
| 1,206,866 | Leggo | Dec. 5, 1916 |
| 1,577,193 | Reed | Mar. 16, 1926 |
| 1,768,505 | Carr | June 24, 1930 |
| 1,798,526 | Fitzgerald | Mar. 31, 1931 |
| 2,095,271 | Swanstrom | Oct. 12, 1937 |
| 2,233,242 | Burke | Feb. 25, 1941 |